Sept. 15, 1936.  C. W. LA PIERRE  2,054,676

PHASE-RESPONSIVE INSTRUMENT

Filed March 21, 1936

Inventor:
Cramer La Pierre,
by Harry E. Dunham
His Attorney.

Patented Sept. 15, 1936

2,054,676

UNITED STATES PATENT OFFICE 2,054,676

PHASE-RESPONSIVE INSTRUMENT

Cramer W. La Pierre, Schenectady, N. Y., assignor to General Electric Company, a corporation of New York Application March 21, 1936, Serial No. 70,053

8 Claims. (Cl. 172—245)

My invention relates to electrical instruments and concerns particularly apparatus responsive to phase relationship between alternating or harmonic quantities.

It is an object of my invention to provide a simple, reliable device for accurately measuring small phase angles, particularly small phase angles between voltages.

Other and further objects and advantages will become apparent as the description proceeds.

In accordance with my invention in its preferred form, I utilize a pair of peaked-wave transformers having their primary windings energized by two voltages, respectively, which are to be compared in phase, and having their secondary windings connected to a current-responsive device in opposition in such a manner that, when the primary voltages are exactly in phase, the peaked secondary waves will exactly cancel each other whereas, when they are slightly out-of-phase, a relatively large reading would be obtained in the current-responsive device.

The invention will be understood more readily from the following detailed description when considered in connection with the accompanying drawing and those features of the invention which are believed to be novel and patentable will be pointed out in the claims appended hereto.

Figure 1:
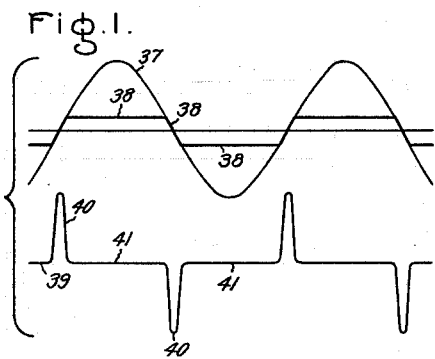
Figure 2:
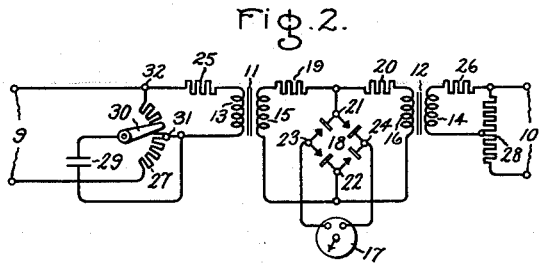
Figure 3:
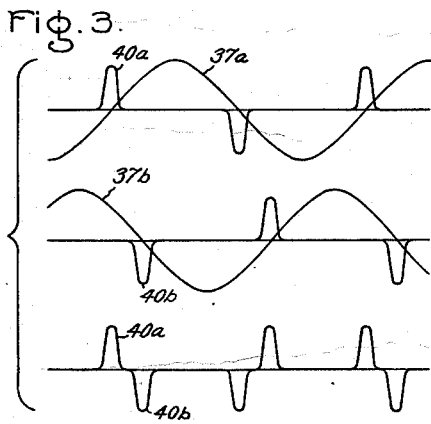
Figure 4:
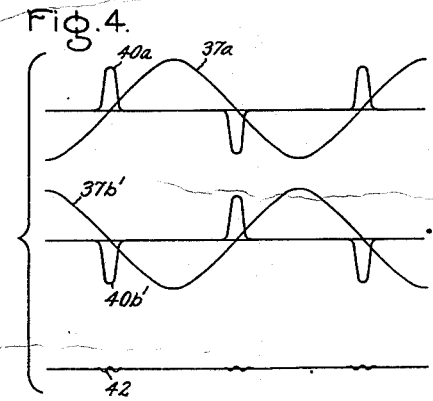
Figure 5:
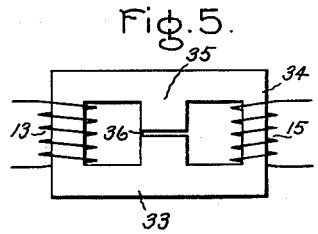

In the drawing, Fig. 1 is a graph explaining the principle of operation of a peaked-wave transformer; Fig. 2 is a circuit diagram illustrating schematically one embodiment of my invention; Figs. 3 and 4 are graphs explaining the principle of operation of my invention under two different conditions; and Fig. 5 is a schematic diagram representing the construction of a peaked-wave transformer.

The apparatus illustrated in Fig. 2 is designed for determining the phase relationship between two voltages or two sources of electromotive force which may be applied to the pairs of terminals 9 and 10, respectively. Two peaked-wave transformers 11 and 12 are provided having primary windings 13 and 14 and secondary windings 15 and 16, respectively. Suitable current-responsive or indicating means are provided and the secondary windings 15 and 16 are preferably connected in opposition to the current-responsive means.

The current-responsive means may take the form of a relay, an oscillograph galvanometer or an indicating instrument 17 to which the secondary windings 15 and 16 are connected in shunt. Preferably, for the sake of obtaining high sensitivity by the use of a d'Arsonval type of instrument, the transformer connections to the current-responsive device 17 are made through a full-wave rectifier 18, which may be of the bridge-connected copper-oxide type, which is well known in the art. In the arrangement shown, the secondary winding 15 is connected to the input terminals 21 and 22 of the rectifier 18 in series with a resistor 19 and the secondary winding 16 is connected to the input terminals 21 and 22 through a resistor 20, the output terminals 23 and 24 of the rectifier 18 being connected to the d'Arsonval instrument 17.

If desired, for the purpose of limiting the current in the primary windings 13 and 14 or for insuring substantial phase coincidence between the magnetizing currents of the transformers and the corresponding applied electromotive forces, resistors 25 and 26 may be provided and the primary windings 13 and 14 may be connected to the terminals 9 and 10 through the resistors 25 and 26, respectively.

For the purpose of making the apparatus suitable for the comparison of electromotive forces of greater value than those for which the windings are designed, tapped resistors or potentiometers 27 and 28 may be provided, which are connected across the input terminals 9 and 10, respectively, and which have portions thereof connected in parallel to the transformer primary windings 13 and 14. If desired, one or both of the tapped resistors 27 and 28 may be provided with adjustable taps to permit changing the range of one or both of the electromotive forces that may be compared.

Preferably, in order that the null method of measurement may be employed, a calibrated phase shifter is provided which may be interposed between one of the electromotive forces to be compared and the corresponding transformer primary winding, for example, between the pair of terminals 9 and the primary winding 13. In the arrangement illustrated, the phase shifter takes the form of a condenser 29 connected between adjustable tap 30 adapted to slide along the resistor 27 and a fixed tap 31 of the resistor 27. The transformer winding 13 is connected across a portion of the resistor 27 between a tap 32 at one end of the resistor 27 and the tap 31 which is intermediate the ends of the resistor 27. It will be understood that the movable tap 30 may be provided with a scale (not shown, for the sake of simplicity) suitably calibrated in terms of phase angle.

The peaked-wave transformers employed may take any suitable form, such as those described, for example, by O. Kiltie in Electrical Engineering for November 1932, page 802, et seq. In the transformer illustrated schematically in Fig. 5, the core 33 is provided with a saturating section 34 carrying the secondary winding 15 and there is a flux-shunting bridge portion 35 including an air gap 36. For low values of magnetizing current and magnetomotive force, the flux tends to flow through the arm 34, owing to the reluctance interposed by the air gap 36. However, with increasing values of magnetizing current and magnetomotive force, the section 34 becomes saturated and gradually increasing portions of the flux are shunted across the air gap 36. As illustrated in Fig. 1, although the magnetizing current and the primary flux of the transformer may be sinusoidal as represented by the curve 37, the flux in the saturating section 34 threading the secondary winding 15 is flat-topped, following the shape of the magnetizing current wave only for short distances above and below the zero line, as illustrated by the heavy curve 38. In consequence of the fact that the sloping portion of the curve 38 is confined to a short distance to either side of the point where it crosses the zero line, the secondary or induced voltage curve 39 will have very narrow peaked portions 40 separated by long flat portions 41 in which the voltage is substantially zero. It has been found that the width of the peaked portions 40 may be made as little as two electrical degrees or even less.

In Fig. 3 is shown the relationship between the applied electromotive force waves 37a and 37b of the transformers 11 and 12 and the corresponding induced voltage peaks 40a and 40b, respectively, for the conditions where the electromotive forces applied to the primary windings 13 and 14 are slightly out-of-phase. Since the transformer secondary windings 15 and 16 are connected in opposition with respect to the current-responsive device 17, the peaks 40a 40b will fall above and below the zero line, respectively. Both peaks will produce positive deflections of the current-responsive instrument 17, however, owing to the action of the rectifier 18 and their effect will be cumulative in the instrument 17.

If the electromotive forces applied to the windings 13 and 14 are brought exactly in phase by adjusting the movable tap 30 of the phase shifter, the peaks 40a and 40b' illustrated in Fig. 4, are brought in exact opposition, and the resultant voltage or current measured in the instrument 17 falls to zero except for the possible effect of higher harmonics or of slight inaccuracies in the electrical dimensions of the apparatus producing the ripples 42 which have, however, substantially no affect on the instrument 17 in comparison with the peaks 40a and 40b in Fig. 3. Inasmuch as the peaks 40a and 40b are very sharp, a very slight phase difference between the electromotive forces applied to the terminals 9 and 10 results in a complete separation of the induced peaks 40a and 40b and permits very sensitive detection of small phase angle differences.

Although phase angles known to be no greater than the width of the peaked wave in electrical degrees might be measured by having the instrument 17 calibrated and not using a phase shifter, instead of by adjusting a calibrated phase shifter for null deflection of the instrument 17, I believe more accurate results may be obtained by the null method. Furthermore, by employing the null method, it is unnecessary that the electromotive forces applied to the transformers be equal, or that the secondary induced voltages be equal, for the setting of the phase shifter, bringing the induced peaks into exact phase opposition, may be ascertained by adjusting the phase shifter to obtain a minimum deflection of the instrument 17.

In accordance with the provisions of the patent statutes, I have described the principle of operation of my invention together with the apparatus which I now consider to represent the best embodiment thereof but I desire to have it understood that the apparatus shown is only illustrative and that the invention may be carried out by other means.

What I claim as new and desire to secure by Letters Patent of the United States is:

1. A phase difference responsive device comprising in combination, a pair of peaked-wave transformers having secondary windings and having primary windings energized by electromotive forces, the phase relationship of which is to be determined, rectifying means, and a current-responsive device, said secondary windings being connected in opposition to said current-responsive device through said rectifying means.

2. In combination, a phase difference responsive device comprising a pair of peaked-wave transformers having primary and secondary windings, said primary windings being adapted to be energized by different sources of electromotive force, and current-responsive means to which said secondary windings are connected in opposition.

3. In combination with two sources of electromotive force, a phase shifter connected to one of said sources, a pair of peaked wave transformers each having primary and secondary windings, the primary winding of one of said transformers being energized by one of said sources through said phase shifter and the primary winding of the other of said transformers being energized by the other of said sources, and current-responsive means to which said secondary windings are connected in opposition.

4. In combination, a pair of peaked-wave transformers with secondary windings, current-responsive means, and a pair of resistors, each of said secondary windings being connected in series with a different one of said resistors to said current-responsive means and being connected in opposition with respect thereto.

5. In combination, a pair of peaked-wave transformers with secondary windings, current-responsive means, rectifying means with output terminals connected to said current-responsive means and input terminals, and a pair of resistors, each of said secondary windings being connected in series with a different one of said resistors to said input terminals.

6. In combination with two sources of electromotive force, a pair of peaked wave transformers with primary and secondary windings, a pair of resistors, and current-responsive means, one of said primary windings being connected in series with one of said resistors to one of said sources of electromotive force, the other of said primary windings being connected in series with the other of said resistors to the other of said sources of electromotive force, said secondary windings being connected to said current-responsive means in opposition.

7. In combination, a pair of resistors, a pair of peaked-wave transformers having primary and secondary windings, and current-responsive means, one of said primary windings being connected across a portion of one of said resistors and the other of said primary windings being connected across a portion of the other of said resistors, said secondary windings being connected to said current-responsive means.

8. In combination, a pair of peaked-wave transformers having primary and secondary windings, a resistor having a movable tap, an end terminal and a terminal intermediate the ends of said resistor, a condenser, and current-responsive means, one of said primary windings being connected to said resistor terminals, said condenser being connected between said intermediate terminal and said movable tap, and said secondary windings being connected to said current-responsive means in opposition.

CRAMER W. La PIERRE.